United States Patent
Bessa et al.

(10) Patent No.: US 6,586,906 B1
(45) Date of Patent: Jul. 1, 2003

(54) SOLAR RECHARGEABLE BATTERY

(75) Inventors: Jerry Bessa, Ojai, CA (US); Omkarnath K. Gupta, Ventura, CA (US); Robert Schilken, Ventura, CA (US); Mark Kollman, Oxnard, CA (US)

(73) Assignee: Genesis Electronics LLC, Ventura, CA (US)

( * ) Notice: Subject to any disclaimer, the term of this patent is extended or adjusted under 35 U.S.C. 154(b) by 0 days.

(21) Appl. No.: 10/066,034

(22) Filed: Jan. 31, 2002

(51) Int. Cl.[7] ................................................. H02J 7/00
(52) U.S. Cl. ...................................................... 320/101
(58) Field of Search .......................................... 320/101

(56) References Cited

U.S. PATENT DOCUMENTS 5,644,207 A * 7/1997 Lew et al. ..................... 307/43

* cited by examiner

Primary Examiner—Gregory J. Toatley, Jr.
(74) Attorney, Agent, or Firm—Michael G. Petit; John Hoel

(57) ABSTRACT

A rechargeable battery having a photovoltaic device and battery charging circuitry integral therewith. A rechargeable battery such as, for example, a Lithium battery, includes a current regulating circuit interposed between a photovoltaic device mounted on an outer surface of the battery and the terminals of the battery. In order to attain maximum power transfer between the photovoltaic device and the battery, the circuit includes a feed-forward feature that regulates the current flow from the photovoltaic cell to the battery in response to changes in the voltage output of the cell. When the voltage output (V) of the photovoltaic cell drops below a predetermined value, the current (I) flowing from the cell to the battery is decreased in accordance with the equation $V=aI+b$, where the coefficients a and b are constants having a value depending on the type of rechargeable battery employed. In a preferred embodiment, the printed circuit board or flex board supporting the current regulating circuit and photovoltaic cell(s) has output current electrical connectors disposed to make electrical connection to side-mounted battery recharging terminal connectors on the side of a novel battery thereby eliminating the need for hard wiring the output of the circuit to the end-mounted battery terminals.

2 Claims, 6 Drawing Sheets

SOLAR RECHARGEABLE BATTERY

BACKGROUND OF THE INVENTION

1. Field of the Invention

This invention relates generally to a method and apparatus for generating electric power from a photovoltaic array and, more particularly, to a method and apparatus that maximizes power output of a photovoltaic array during varying ambient weather conditions and delivers the generated electric power to a battery.

2. Prior Art

In a typical and common application of a photovoltaic array, the photovoltaic array is used to supply electric energy and electric power directly to a load. While this configuration is adequate for daylight operation, the photovoltaic array may cease to provide electric energy and electric power during periods of darkness or periods of reduced incident solar radiation. Therefore, many photovoltaic array configurations include a battery that is charged by the photovoltaic array during periods of incident solar radiation. The energy stored in the battery can then be used to supply electric energy and electric power to a load during periods of darkness or periods of reduced incident solar radiation. This in turn causes the battery to discharge. With this type of configuration, therefore, the photovoltaic array and the battery act together to keep the load continuously supplied with electric energy and electric power and the battery is alternately charged and discharged.

In order to most efficiently use the electrical power generated by a photovoltaic cell or photovoltaic array, it is desirable to maximize the power generated by the photovoltaic cell or photovoltaic array, despite varying weather conditions. Maximizing the power generated by a photovoltaic cell or photovoltaic array requires the determination of the optimal operating conditions for the photovoltaic cell or photovoltaic array for the given weather conditions, i.e., it is necessary to find the operating point on the voltage-versus-current curve for the photovoltaic cell or photovoltaic array that maximizes the power output from the photovoltaic cell or photovoltaic array. In addition, a generator system incorporating a photovoltaic cell or photovoltaic array must be able to determine optimal operating parameters for the generator system for varying temperatures and varying amounts of solar radiation incident on the photovoltaic cell or photovoltaic array.

Various circuits have been developed for the purpose of supplying electric energy generated by a photovoltaic cell or an array of photovoltaic cells to a battery or load. For example, U.S. Pat. No. 4,510,434, issued to Assbeck et al., U.S. Pat. No. 4,494,180, issued to Streater et al., and U.S. Pat. No. 4,404,472, issued to Steigerwald, disclose such circuits. In Assbeck et al., the automatic setting of the optimum operating point of a DC voltage source involves changing the duty cycle of a switch in a DC chopper to create variations in the measured voltage of the DC voltage source and changing the duty cycle accordingly until the optimal operating point is reached. The apparatus disclosed in Assbeck et al., however, requires the monitoring of both the electric voltage and current produced by the solar generator, which increases the complexity of the disclosed apparatus. In Streater et al., a load is matched to a source so that optimal operating conditions are obtained, requiring that the load remain electrically connected to the system at all times. The control disclosed in Steigerwald uses a DC-to-AC inverter or DC-to-DC converter to create a commanded electric current for a solar array which is compared to the resulting measured electric current from the solar array. The difference between the two signals controls the electric current and the power drawn from the solar array.

Baker, in U.S. Pat. No. 4,375,662, discloses a system wherein the DC power supplied by a photovoltaic cell, or an array of such cells, to a load is controlled by monitoring the slope of the photovoltaic cell output voltage vs. current characteristic and adjusting the current supplied by the photovoltaic cell to the load so that the slope is approximately unity. The slope is monitored by incrementally changing the load on the photovoltaic cell and determining whether the resulting change in current derived from the cell is above or below a reference value, indicative of the cell voltage. In response to the change in the monitored current being above the reference value, the slope of a voltage vs. current curve is greater than unity and the load is adjusted to decrease the current supplied by the photovoltaic cell to the load. Conversely, in response to the current being less than the reference value, the slope of the voltage vs. current curve is less than unity and the load is adjusted to increase the current supplied by the photovoltaic cell to the load.

Each of the disclosed systems also continuously search for the operating conditions that maximize the power output of the photovoltaic cell or photovoltaic array. Once the optimal operating conditions have been determined, the systems intentionally change the operating conditions to non-optimal operating conditions and restart the process of determining the optimal operating conditions. Therefore, the disclosed systems do not provide for extended or sustained operation at the optimal operating conditions once the optimal operating conditions have been determined, which causes a loss in efficiency of the systems and reduces the power delivered by the photovoltaic device to a battery or load. Consequently, in spite of the well-developed state of solar array and photovoltaic array technology, there is still a need for a peak power tracker for a photovoltaic array that is simple to construct, operates the photovoltaic array at peak power output for significant periods of time, and allows the electric energy and electric power produced by the photovoltaic array to be stored in a battery.

Muljadi et al., in U.S. Pat. No. 5,747,967, disclose a method and apparatus for maximizing the electric power output of a photovoltaic array connected to a battery. The voltage across the photovoltaic array is adjusted through a range of voltages to find the voltage across the photovoltaic array that maximizes the electric power generated by the photovoltaic array and then is held constant for a period of time. After the period of time has elapsed, the electric voltage across the photovoltaic array is again adjusted through a range of voltages and the process is repeated. The electric energy and the electric power generated by the photovoltaic array is delivered to the battery which stores the electric energy and the electric power for later delivery to a load.

Adams et al., in U.S. Pat. No. 6,205,656, disclose a method for attaching a photovoltaic cell or an array of such cells, to a PC board. Thus, while the method of Adams et al. for attaching a photovoltaic device to a circuit board is known, and circuits for optimizing the power transfer from such a photovoltaic device to a load such as a rechargeable battery are known, there remains a need for a rechargeable battery having a photovoltaic cell and recharging circuitry integral with the battery.

SUMMARY

It is a first object of the present invention to provide a rechargeable battery having light responsive recharging means integral therewith.

It is a further object of the present invention to provide a rechargeable battery having light responsive recharging means integral therewith wherein the light responsive recharging means comprises a photovoltaic cell.

It is a yet a further object of the present invention to provide a rechargeable battery having light responsive recharging means operable for generating power in response to exposure to light and a power transfer optimization circuit integral therewith, the circuit being operable for optimizing power transfer from the recharging means to the rechargeable battery under a variety of lighting conditions.

The above objectives are met by a battery module comprising a rechargeable battery, a printed circuit board, a photovoltaic cell affixed to an outer surface of said printed circuit board and a rechargeable battery and a recharging circuit, wherein said photovoltaic cell, said printed circuit board and said recharging circuit are affixed to, and integral with, said rechargeable battery. The term "integral", as used herein to describe a particular construction, means that the members comprising the construction are affixed to one another and are inseparable from one another in normal use. The rechargeable battery may have two end-mounted power output terminals and two side-mounted recharging terminals, each of said recharging terminals being in electrical communication with one of said power output terminals.

The features of the invention believed to be novel are set forth with particularity in the appended claims. However the invention itself, both as to organization and method of operation, together with further objects and advantages thereof may be best understood by reference to the following description taken in conjunction with the accompanying drawings in which:

DESCRIPTION OF THE PREFERRED EMBODIMENTS

Figure 1:
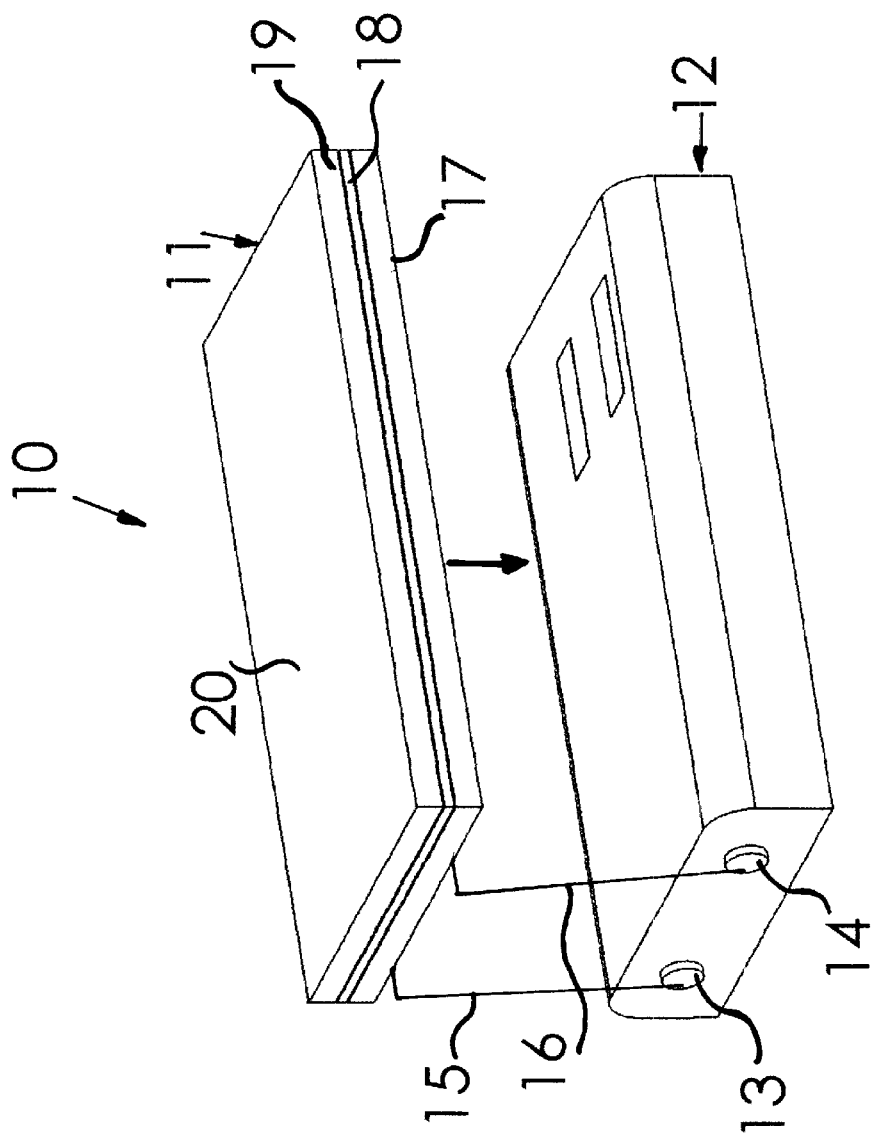
FIG. 1 is a schematic view of a rechargeable battery and a battery recharging unit integral with the battery in accordance with the present invention.

Turning now to FIG. 1, a rechargeable battery 12 and battery recharging module 11 in accordance with an embodiment of the present invention is illustrated in perspective view at numeral 10 with the recharging unit 11 separated from the rechargeable battery 12. The rechargeable battery 12 has a pair of end-mounted electrodes 13 and 14 having opposite polarity accessible on an outer surface thereof. A pair of electrically conductive leads or traces 15 and 16 provide electrical connection between the output of a battery recharging circuit 17 affixed to the lower surface of a PC board 18 and the end-mounted battery electrodes. The upper surface of the PC board 18 has one or more photovoltaic cells 19 mounted thereon. The term "photovoltaic cell", as used herein, includes any device that is operable for transducing photon energy into electrical energy. A transparent coating 20 provides mechanical protection for the photovoltaic cell(s) 19. The recharging unit 11 comprises, in combination, the PC board 18, the recharging circuit 17, the photovoltaic cell(s) 19 and the transparent coating 20.

Figure 2:
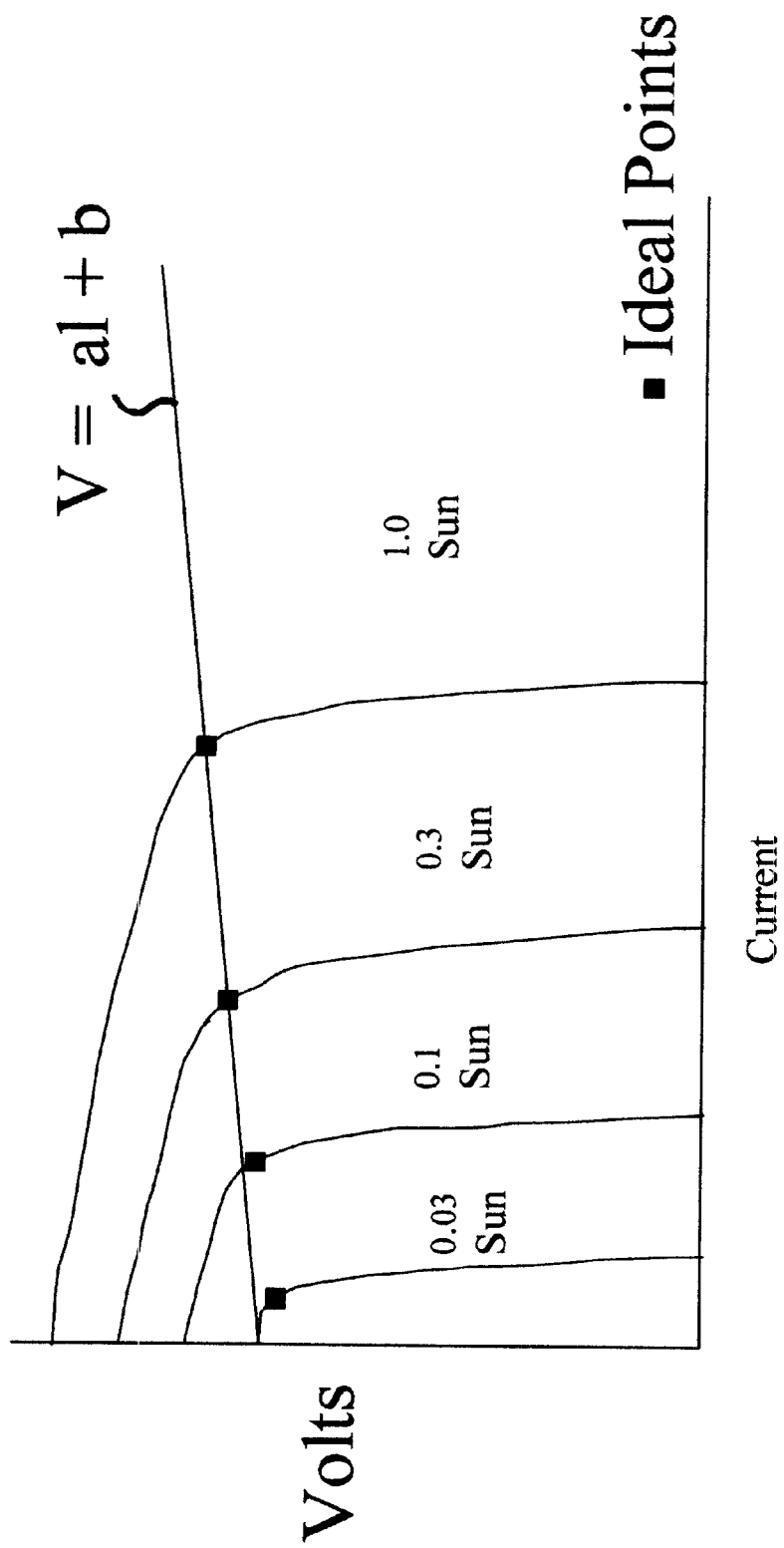
FIG. 2 is a graphical illustration of the current (I) and voltage (V) output of a typical solar cell.

When considering the structure of a recharging circuit 17 with a view toward optimizing power transfer to a battery, it is instructive to to consider the relationship between the voltage and current output of a typical photovoltaic cell as illustrated in FIG. 2. The optimum power output for a photovoltaic cell is a function of the intensity of light incident on the surface of the photovoltaic substrate. In general, the optimum power output of a photovoltaic cell varies in a pattern that produces a curve that can be approximated by a straight line when incident light intensity ranges between 0.1 sun and 1.0 sun in accordance with the straight line equation: $V=aI+b$, where V is the voltage output of the cell, and I is the current drawn from the cell. For multi-junction high efficiency solar cells, the slope (a) of the line approaches zero so as to maintain a constant voltage on the solar cell that is substantially independent of illuminence.

Most battery charging algorithms in use today implement one or more stages. In each stage, the battery is charged at a limited rate of current to a given voltage set point. In the case of Lithium chemistry, a single stage "voltage limited, current limited" charge algorithm is capable of recharging the battery to 100% of full capacity. Very high efficiency, high frequency DC to DC, boost or buck converter chips can be utilized in a simple, low component count charging circuit. However the problem is that these DC to DC converters are designed to produce a fixed voltage output, and will draw as much current from the cell as is necessary to maintain the set voltage. As the battery voltage changes due to state of charge of the battery and variations in power loading, the current drawn from the photovoltaic cell immediately becomes non-ideal for extracting maximum power from the cell.

Figure 3:
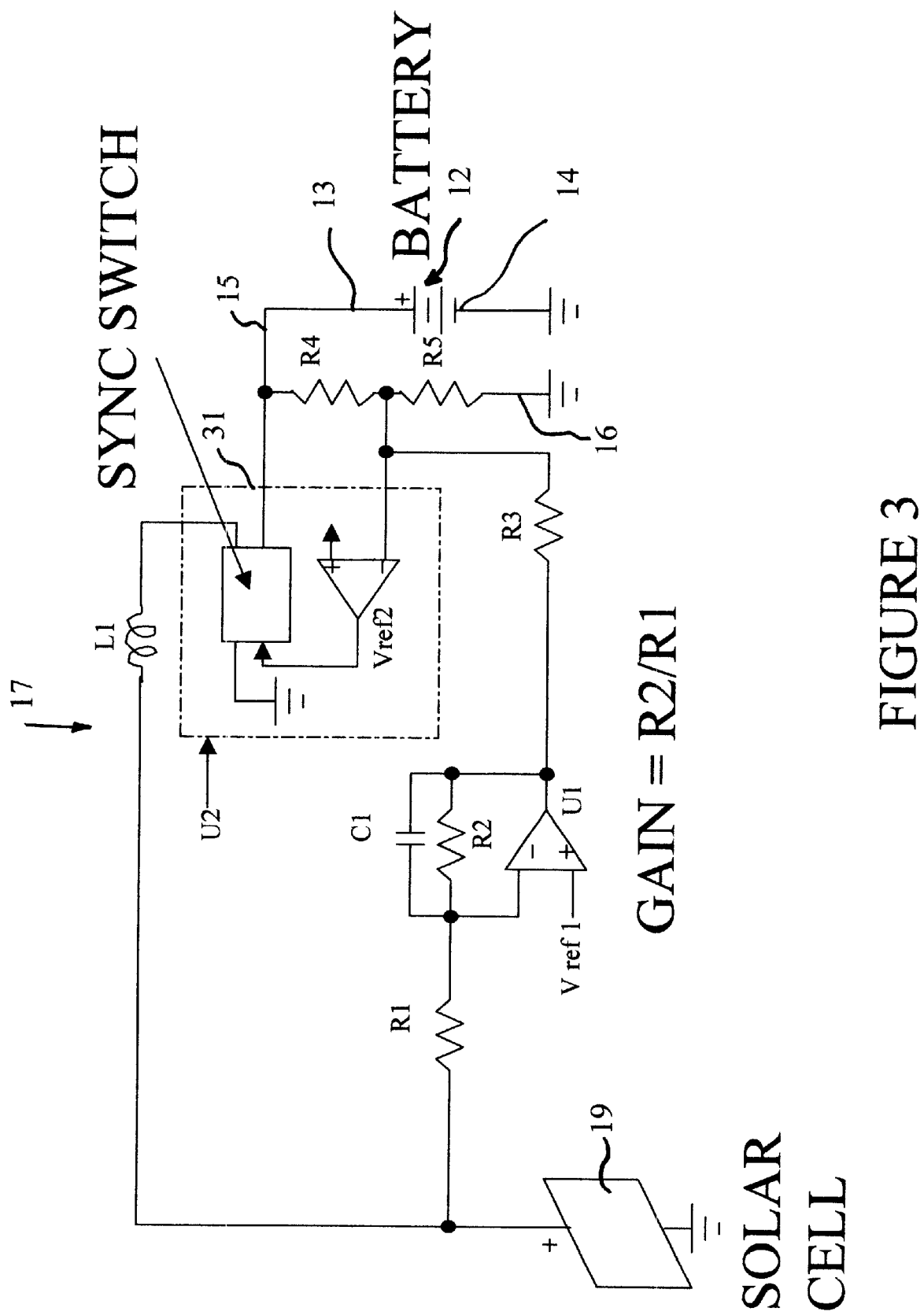
FIG. 3 is a circuit diagram generally illustrating a recharging circuit in accordance with the present invention.

Returning for a moment to FIG. 2, it is clear that when more than the optimum current is drawn from a photovoltaic cell, the voltage output of the cell rapidly drops to an unacceptable level that provides less than optimum power transfer to a load such as a battery 12. The circuit 17 of FIG. 3, or the current regulating circuit 40 of FIG. 4, overcomes this limitation by comparing the output voltage of the photovoltaic cell 19 to a fixed reference voltage (Vref 1) and feeding forward a signal to a converter 31 which adjusts the output voltage set point to automatically return the input current to the optimum photovoltaic cell value for any given solar illuminance. This "feed forward" technique can be implemented with any desired gain to match the photovoltaic cell's approximated optimum power point curve as depicted in FIG. 2. Additionally, with a "Rail to Rail" output, or other low output voltage limited operational amplifier, along with the correct resistor component values, the circuit 17 will automatically limit the charging voltage to the battery.

Figure 4:
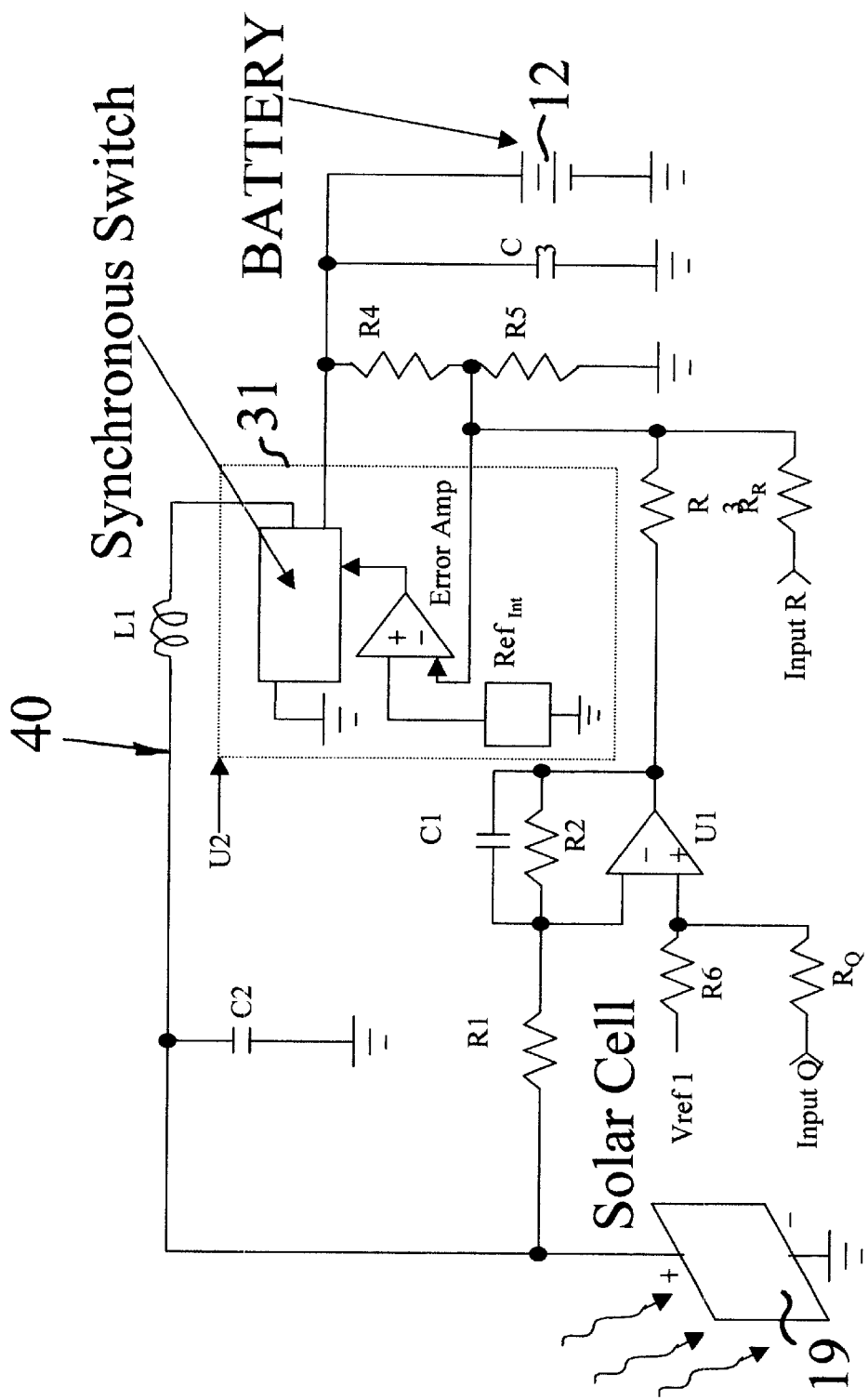
FIG. 4 is a circuit diagram illustrating with particularity a recharging circuit in accordance with a first preferred embodiment of the present invention.

A preferred embodiment of the recharging circuit 17 for use with a single 2 VDC photovoltaic cell is illustrated with particularity in schematic view at numeral 40 in FIG. 4. If $Ref_{Int}$, the internal voltage reference of the boost converter, is 1.24 VDC, the following exemplary component values may be used: C1: 47 picofarads, C2: 33 microfarads, C3: 100 microfarads, L1: 3.3 microHenries, R1: 100 Kohms, R2: Not Installed, R3: 331 Kohm, R4: 270 Kohm, R5: 171 Kohm, R6: Not Installed—for a gain of >10,000, $R_Q$ Not Installed, $R_R$: Not Installed. The voltage limit set by circuit 120 is as accurate as the on-board voltage reference of the DC to DC converter chip and the precision of the external components, and is, therefore, usually sufficient to guarantee optimum battery charging. In one embodiment, a lithium ion battery is automatically charged to exactly 4.2 VDC while using the internal precision reference of the DC to DC boost converter as Vref1 to reduce component count.

In the preferred embodiment 10 of the rechargeable battery having a photovoltaic recharging unit integral therewith, the photovoltaic cell(s) 19 are applied to an upper surface of a PC board 18, either as a single large cell, or as a "shingled" configuration comprising a plurality of series-connected individual photovoltaic cells. The recharging circuit, as discussed herein, may be thought of as a current regulating circuit operable for limiting the current drawn from the photovoltaic cell(s). The photovoltaic cell(s) 19 may be disposed on the upper surface of the PC board 18 by the method set forth in U.S. Pat. No. 5,801,512, or a similar method. The recharging circuit 17 (FIGS. 1 and 3) or 40 (FIG. 4) is preferably etched or deposited on the lower surface of the PC board 18 (i.e., the surface of the PC board in opposition to the surface bearing the photovoltaic cell(s)). The output terminals of the photovoltaic cell(s) 19 are connected to the recharging circuit 17 by feed-through connectors in the PC board 18 (not shown). The transparent coating 20 is preferably a plastic resin, which may be dip-coated to cover the photovoltaic cell(s) and the upper surface of the PC board and cured, or a transparent sheet of cured plastic may be laminated to the PC board to cover the photovoltaic cell(s) and provide mechanical protection therefor. The conductive leads 15 and 16 from the output of the recharging circuit 17 may be connected to end-mounted battery terminals 13 and 14 by snap on connectors or soldered thereto.

Figure 5:
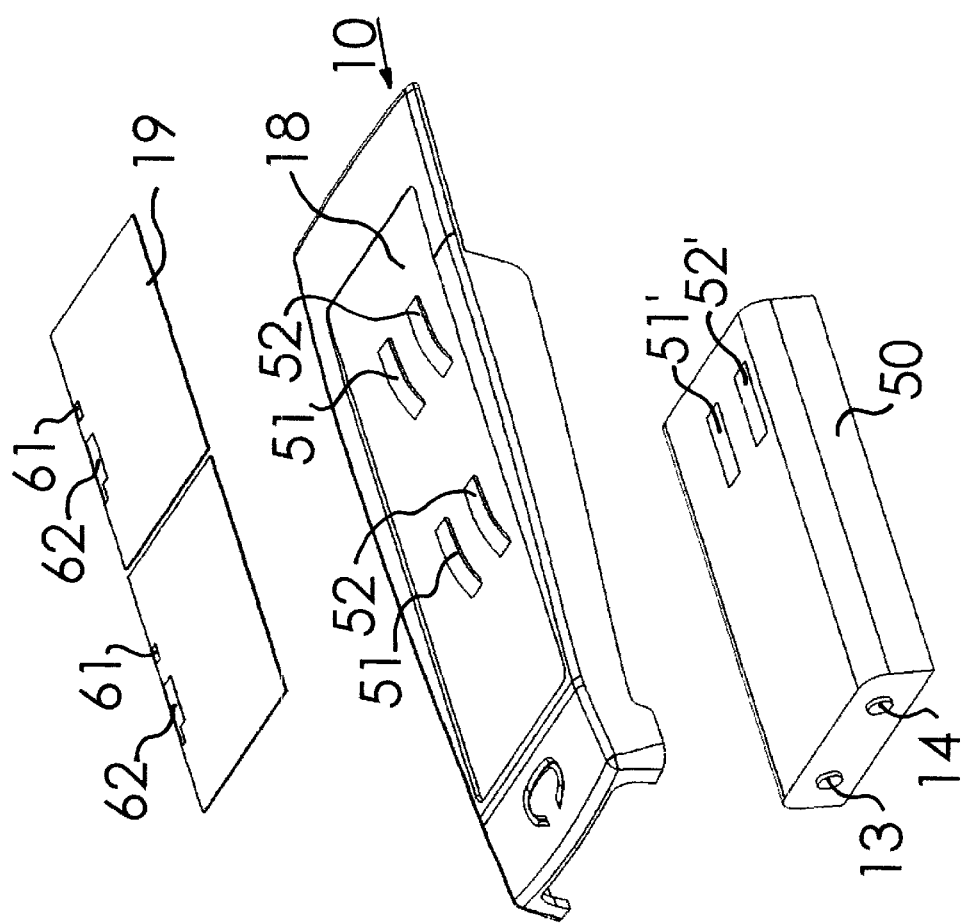
FIG. 5 is a top exploded view illustrating the relationship between the output terminals of the current regulating circuit and the side-mounted recharging terminals of the battery in a preferred embodiment of the present invention.
Figure 6:
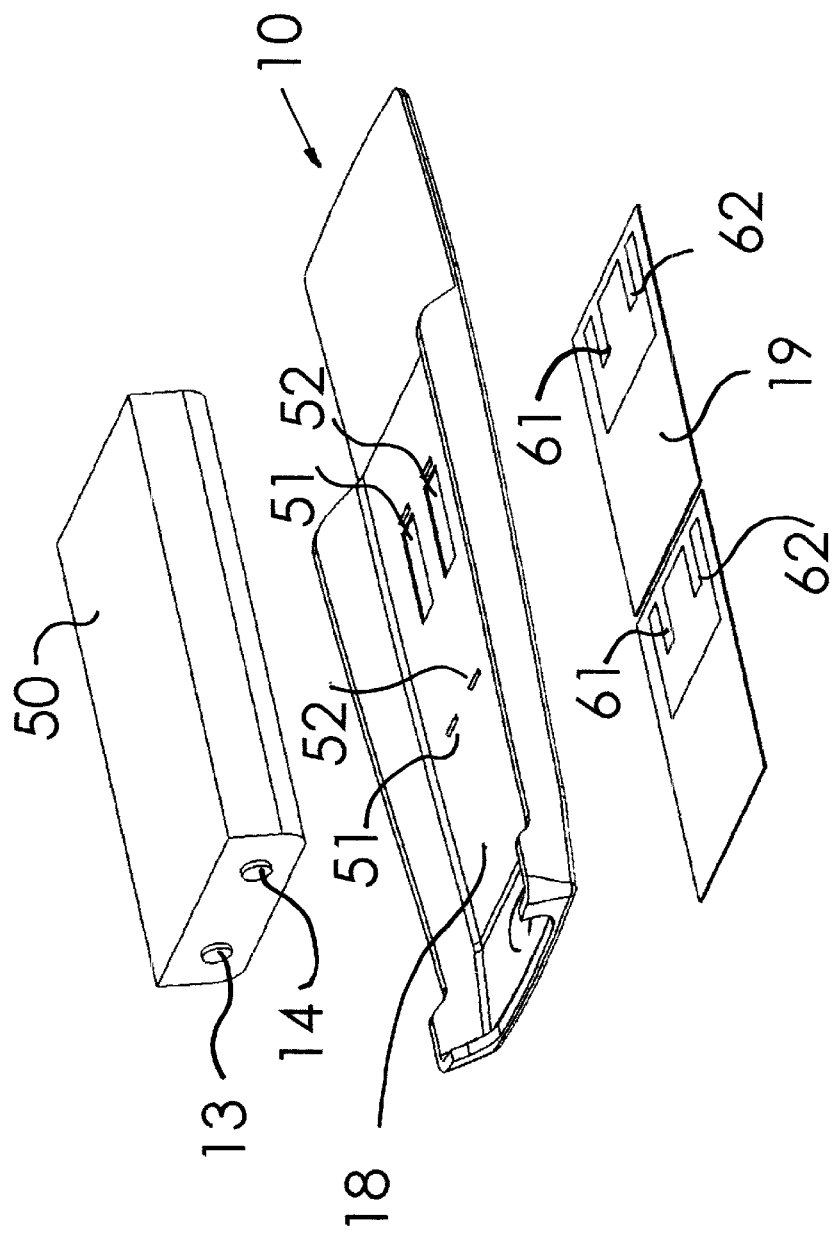
FIG. 6 is an exploded view, viewed from the bottom, illustrating the relationship between the output terminals of the current regulating circuit and the side-mounted recharging terminals of the battery and the photovoltaic cell mounted on the cover of a cellular phone in accordance with a preferred embodiment of the present invention.

In a preferred embodiment of the photovoltaic cell(s)-recharging circuit-rechargeable battery assembly, in order to facilitate electrical connection between the output terminals of the photovoltaic cell(s) and the input terminals of the current regulating circuit 17 or 40, and between the output terminals of the current regulating circuit and the battery terminals 13 and 14 without the need for hard wiring or using snap-on connectors, a novel rechargeable battery 50 (FIG. 5) having a pair of side-mounted recharging electrodes 51' and 52' that are internally connected to battery terminals 13 and 14 may be used. The flex circuit or PC board 18 includes electrically conductive prongs 51 and 52 that make electrical connection to battery recharging terminals 51' and 52' which are conductive pads disposed on the side of the rechargeable battery 50. Similarly, prongs 52 and 53 on the PC board make electrical connection with the output electrodes 61 and 62 of the photovoltaic cell(s) 19.

While particular embodiments of the present invention have been illustrated and described, it would be obvious to those skilled in the art that various other changes and modifications can be made without departing from the spirit and scope of the invention. For example, the recharging unit 11 may be adhered to an outer surface of the battery case by a nonconductive adhesive or form part of the casing of the battery 12. It is therefore intended to cover in the appended claims all such changes and modifications that are within the scope of this invention.

What we claim is:

1. A battery module comprising a nonpolymer rechargeable battery, a printed circuit board having an inner surface and an outer surface disposed in opposition to said inner surface, a photovoltaic cell affixed to said outer surface of said printed circuit board, a recharging circuit affixed to said inner surface of said printed circuit board, wherein said inner surface of said printed circuit board is affixed to said rechargeable battery and wherein said recharging circuit is operable for controlling the flow of electrical current between said photovoltaic cell and said rechargeable battery to provide optimum energy transfer from said photovoltaic cell to said rechargeable battery, and wherein said rechargeable battery has two end-mounted power output terminals and two side-mounted recharging terminals, each of said recharging terminals being in electrical communication with one of said power output terminals.

2. The battery module of claim 1 wherein said recharging circuit comprises means for measuring a voltage output from said photovoltaic cell and comparing said voltage output to a reference voltage, and means for controlling current flowing between said photovoltaic cell and said battery in response to the difference between said photovoltaic cell output voltage and said reference voltage.

* * * * *